(12) United States Patent
Rubinstein

(10) Patent No.: US 9,939,345 B2
(45) Date of Patent: Apr. 10, 2018

(54) FLUID LEAKAGE DETECTION SYSTEM

(71) Applicants: HAMUT—MECHANICS AND TECHNOLOGY COMPNY LTD, Modiin (IL); Adam Rubinstein, Modiin (IL)

(72) Inventor: Adam Rubinstein, Modiin (IL)

( * ) Notice: Subject to any disclaimer, the term of this patent is extended or adjusted under 35 U.S.C. 154(b) by 0 days.

(21) Appl. No.: 15/304,556

(22) PCT Filed: Apr. 30, 2015

(86) PCT No.: PCT/IL2015/050451
§ 371 (c)(1),
(2) Date: Oct. 17, 2016

(87) PCT Pub. No.: WO2015/177780
PCT Pub. Date: Nov. 26, 2015

(65) Prior Publication Data
US 2017/0045414 A1    Feb. 16, 2017

Related U.S. Application Data

(60) Provisional application No. 62/000,158, filed on May 19, 2014.

(51) Int. Cl.
*G01F 3/06*  (2006.01)
*G01M 3/28*  (2006.01)
*G01F 15/02* (2006.01)

(52) U.S. Cl.
CPC ................. *G01M 3/28* (2013.01); *G01F 3/06* (2013.01); *G01F 15/02* (2013.01); *G01M 3/2807* (2013.01)

(58) Field of Classification Search
CPC .............. G01F 3/06; G01M 3/28; G01M 3/04
See application file for complete search history.

(56) References Cited

U.S. PATENT DOCUMENTS

| | | |
|---|---|---|
| 3,213,929 A | 10/1965 | Marshall et al. |
| 3,695,097 A | 10/1972 | Michalowicz |
| 3,723,987 A | 3/1973 | Barone et al. |
| 6,481,265 B1 | 11/2002 | Weber |
| 6,551,348 B1 | 4/2003 | Blalock et al. |
| 6,708,571 B1 | 3/2004 | Hopfe et al. |
| 6,796,173 B1* | 9/2004 | Lajoie ........................ G01F 3/10 73/261 |
| 8,656,698 B1 | 2/2014 | Jansen et al. |
| 9,523,597 B2* | 12/2016 | Williams .............. G01F 15/007 |
| 2012/0022441 A1* | 1/2012 | Kelly .................. A61M 1/1696 604/29 |

FOREIGN PATENT DOCUMENTS

GB    1 595 787 A    8/1976

* cited by examiner

*Primary Examiner* — Jewel V Dowtin
(74) *Attorney, Agent, or Firm* — Smith Tempel Blaha LLC; Gregory Scott Smith

(57) ABSTRACT

A fluid leakage detection system that includes identical positive displacement flow meters positioned on a working fluid supply line of a system through which the fluid flows and a flow meter positioned on a working fluid return line. The positive displacement flow meters are mechanically coupled between them.

18 Claims, 9 Drawing Sheets

FLUID LEAKAGE DETECTION SYSTEM

TECHNOLOGY FIELD

The present system relates to the prevention of damage to electronic systems, generators, motors and other systems utilizing closed fluid systems from fluid leakage.

BACKGROUND

In a large majority of equipment cooling or heating of the equipment is performed by closed circuit systems. Closed circuit systems support conditioning of a cooling or heating fluid that in a large majority of cases would be water. Undetected or late detected fluid leakage could cause damage to the equipment where the fluid system resides. In order to detect a leakage, in such systems fluid inflow and outflow are monitored. Typical examples of such closed fluid systems are cooling systems of electronic equipment, high power lasers, ultraviolet lamps, electric generators, motors of power stations and others, where even a small fluid leakage can cause significant damage.

Monitoring of fluid inflow or supply and outflow or return in a closed circuit or even in an open circuit system allows to calculate the difference between the fluid inflow and the fluid outflow. If a difference between the fluid inflow and fluid outflow exists, there is a fluid leak in the system. The monitored values of the fluid inflow and outflow could be quite large, hundreds and thousands of liters per minute, although a leakage of a fraction of liter could sometimes cause significant damage to the cooled or heated equipment. Especially dangerous are internal fluid leakages that do not appear immediately on the surface and it takes time to discover them.

U.S. Pat. Nos. 3,484,085, 4,133,373, 4,705,060, 4,944,253, 5,188,143, 5,357,241, 6,481,265 and patent applications publications 2003/0110834 and 2013/0333447 disclose different leakage measurement and detection systems.

Glossary

The term "positive displacement flow meter" as used in the current disclosure is a type of flow meter that requires fluid to mechanically displace components in the meter in order for flow measurement. Positive displacement (PD) flow meters measure the volumetric flow rate of a moving fluid.

The term "differential pressure sensor" as used in the current disclosure is a sensor that measures the difference between two pressures, with one pressure line connected to each side of the sensor.

The term "fluid leakage" as used in the current disclosure relates to leakage out of the system. Internal leakage is a leakage between the inlet and the outlet of the flow meter, which is not leaking out of system, and it is usually a relatively small as compared to the measured flow.

BRIEF SUMMARY

A fluid leakage detection system that includes a first positive displacement flow meter positioned on a working fluid supply line of a system through which the fluid flows and a second positive displacement flow meter positioned on a working fluid return line. The positive displacement flow meters include an output rotating element. The output rotating element of the first positive displacement flow meter and the output rotating element of the second positive displacement flow meter are mechanically linked between them such that the output rotating element of the first positive displacement flow meter and the output rotating element of the second positive displacement flow meter rotate at the same speed.

In one example, a single differential pressure sensor is connected across the output flow meter and configured to gauge pressure drop in the second positive displacement flow meter. The first and second flow meters could be made of materials having thermal expansion coefficients selected to correspond to and automatically correct for known expected temperature-related differences in fluid volume in the supply line and the fluid volume in the return line. Alternatively, the first and second positive displacement flow meters could be pre-designed to have different volumes selected to compensate for known expected temperature-related differences between the working fluid volume in the fluid supply line and the working fluid volume in the fluid return line.

In another example, two pressure sensors of which one or first pressure sensor is configured to gauge pressure drop in the first positive displacement flow meter and another or second pressure sensor is configured to gauge pressure drop in the second positive displacement flow meter. Presence of difference in pressure drops between the first positive displacement flow meter and the second positive displacement flow meter is indicative of fluid leakage in the system to be cooled or heated.

The system could also include one or more temperature gauges positioned on the fluid supply line and on the fluid return line. The temperature gauge could be also a differential temperature gauge. The measured temperature difference between the first and the second temperature gauges could be used to compensate the flow measurements for temperature-related differences between the fluid volume in the fluid supply line and the fluid volume in the fluid return line and for temperature related changes in the flow meters.

In one example the first and second flow meters are made of materials having thermal expansion coefficients selected to correspond to and automatically correct for known expected temperature-related differences in fluid volume in the supply line and the fluid volume in the fluid return line.

LIST OF FIGURES AND THEIR BRIEF DESCRIPTION

DESCRIPTION

There are a number of systems for measurement and detection of a working fluid leakage in a closed cooling or heating fluid system. The working fluid leakage could be external, which is damaging but could be relatively easy detected even if it is a small fraction of a percent. The working fluid leakage could be internal, where while it is not damaging, it could reduce the accuracy of the flow measurement and disguise damaging external leakage. Neither one of the existing systems supports the accuracy of fluid leakage detection required for detection of internal working fluid leakage.

These present system is constructed to meet the accuracy required for external working fluid leakage detection and supports working fluid detection capability much better than the existing working fluid leakage detection systems for similar flow rates support.

Figure 1A:
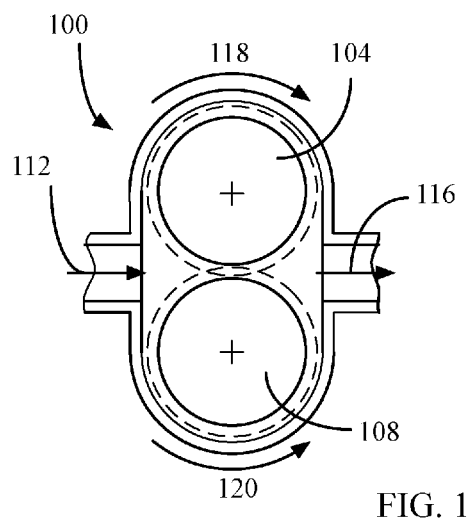
FIGS. 1A-1C are examples of different existing positive displacement meters.
Figure 1B:
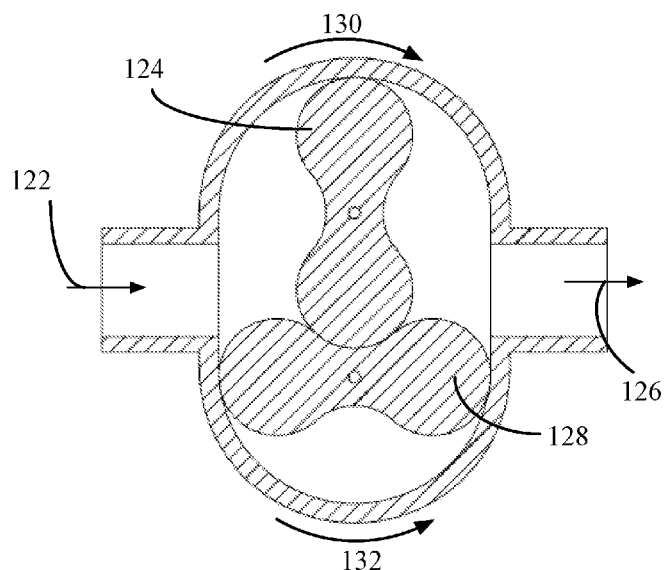
Figure 1C:
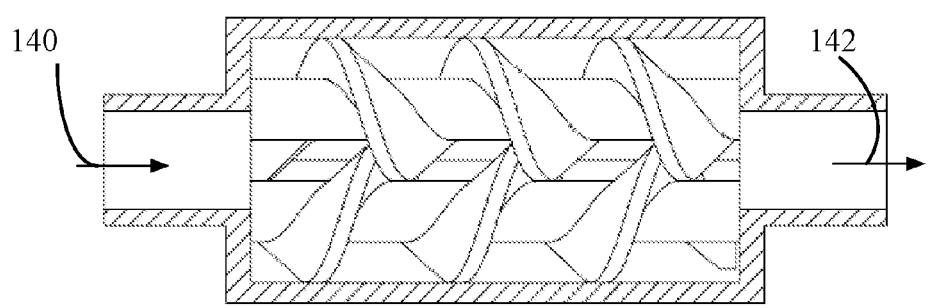

Reference is made to FIGS. 1A-1C which are different examples of positive displacement meters. The examples illustrate gear flow meters, although other types of flow meters such as oval gears, nutating disks, helical (FIG. 1C), diaphragm, piston and others are known in the art. Positive displacement gear flow meters rely on internal gears rotating as fluid passes through them. The naming convention of various types of flow meters is simply derived from the shape of the positive displacement mechanism.

FIG. 1A is an example of a cylindrical positive displacement gear meter 100, where two cylindrical gears engage each other in course of the meter operation. The two gears 104 and 108 with meshed teeth push a finite amount of fluid through the meter for each revolution. As the fluid flows through the cylinder, the pressure of the fluid causes the gears or rotors to rotate. As fluid flow rate increases, so does the rotational speed of the rotors 104 and 108. The rotational speed of the rotors is used in calculations of the flow rate. Arrows 112 and 116 show the direction of working fluid supply and fluid return flow and arrows 118 and 120 show the direction of rotors rotation.

FIG. 1B is an example of a positive displacement "kidney" gear meter that in a simples configuration uses two kidney-like rotating bodies 124 and 128 engaging each other. Incoming fluid exerts a pressure differential against the (upstream end) lower face of gear 10 (A), causing the two interlocked gears to rotate to the next position. In this second position, the flowing liquid enters the cavity between gear 124 and 128 and the flow meter body wall, while an equal volume of liquid simultaneously passes out of the cavity between gears 124 and 128 A and the flow meter body wall. Meanwhile, upstream pressure continues to force the two gears to rotate to the next position. At this position, a predetermined quantity of liquid has again filled the cavity between the gear 128 and the flow meter body. This pattern is continuously repeated moving the liquid capacity of each cavity with each revolution of the rotating bodies 124 and 128 as shown by arrows 130 and 132. Therefore, the flow rate is proportional to the rotational speed of the gears. Arrows 122 and 126 show the direction of working fluid supply and fluid return flow.

FIG. 1C is an example of existing helical type positive displacement flow meter. Arrows 140 and 142 show the direction of working fluid supply and fluid return flow.

Almost all existing positive displacement flow meters are mechanical constructions that include at least one output rotating element, although the flow meters reading could be an electrical reading.

Figure 2:
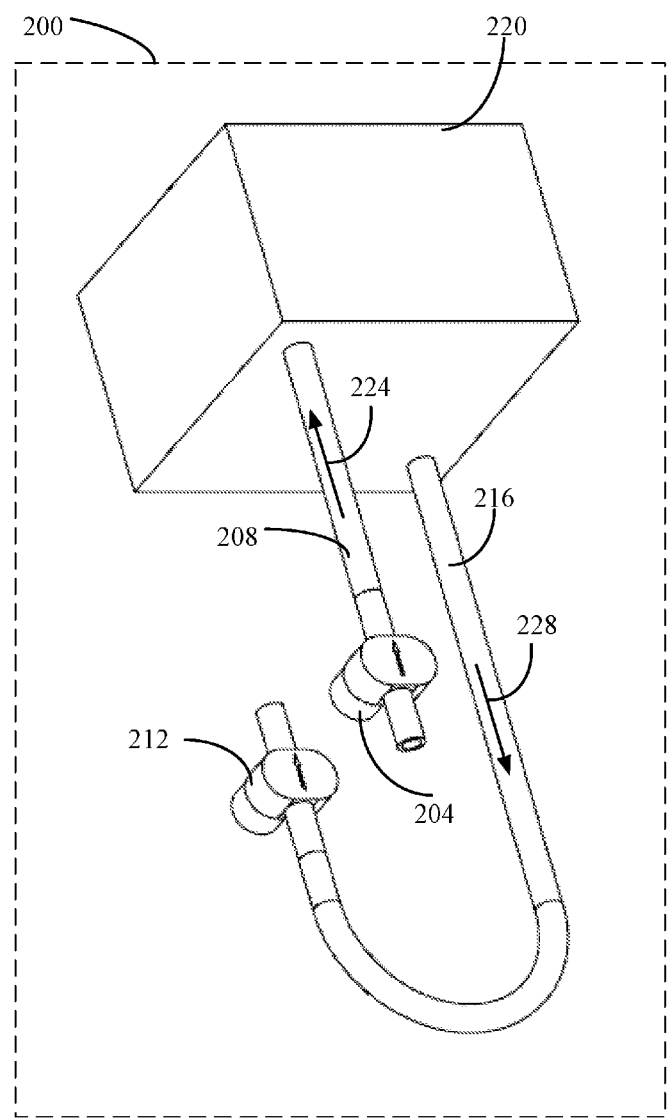
FIG. 2 is an illustration of the existing fluid leakage detection methods, by comparing readings of two standard flow meters.

FIG. 2 is an illustration of an existing fluid leakage detection system and method. System 200 detects fluid leakage by comparing readings of two standard flow meters 204 and 212. For example, standard flow meter 204 could be configured to measure the volume of the inflow or supply fluid flowing as shown by arrow 224 through tube 208 and another standard flow meter 212 could be configured to measure volume of the outflow or return fluid flowing as shown by arrow 228 through tube 216. System 200 detects fluid leakage by comparing readings of two standard flow meters 204 and 212. Reference numeral 220 marks an object to be heated or cooled by the fluid. Standard flow meters 204 and 212 could be of any known type including positive displacement meters.

One of the problems with such a system is the limited accuracy of the flow meters that limits the threshold of leakage detection to typically 1% of the flow. Another problem with use of such positive displacement meters is related to the fact that the inflow fluid and the outflow fluid would typically have a different temperature and although the meters could be identical, the expansion of the flow meter construction materials could cause them to have different chamber volumes. The metered fluid also changes its volume due to the temperature. However, leakage is defined by the mass flow and not by the volumetric flow, and therefore in order to detect minute leaks a compensation for temperature differences is desired.

Another problem is related to the fact that the meter placed at the inflow or working fluid supply line and the meter placed at the outflow or working fluid return line could be different and introduce a measurement error in the differential flow measurement.

Figure 3:
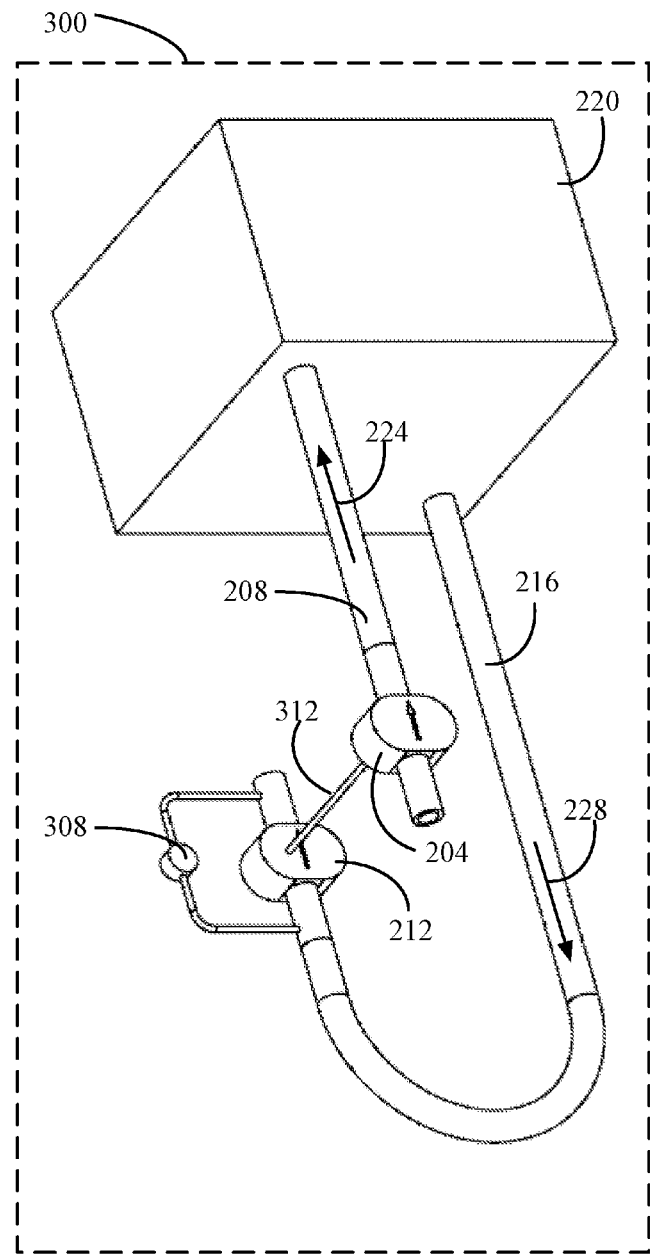
FIG. 3 is an example of the present fluid leakage detection system.

FIG. 3 is an example of the present fluid leakage detection system. Fluid leakage detection system 300 includes a first positive displacement flow meter 204 positioned on a working fluid inflow of fluid supply line 208 through which the working fluid flows into object 220 and a second identical positive displacement flow meter 212 positioned on a working fluid outflow or fluid return line 216 through which the working fluid flows out of object 220. Arrows 224 and 228 show the fluid flow direction. A differential pressure gauge 308 is positioned on the fluid return line 216, between the input and the output of the flow meter 212. Positive displacement flow meters are configured to have a mechanical connection 312 between one rotating element of the first positive displacement flow meter 204 and the matching rotating element of the second positive displacement flow meter 212 such that they will be forced to rotate at the same speed. If there is a leakage somewhere in the system between the flow meters, the first flow meter will tend to rotate at a faster speed than the second flow meter. However, since they are forced by the mechanical connection to rotate at the same speed the first flow meter will be slowed down, increasing the pressure drop on it while the second flow meter will be forced to speed up, reducing the pressure drop on it. In the case of positive displacement flow meters without existing internal leaks the second flow meter will develop certain back flow superposed on the forward flow. This will show as a negative pressure on the reading of the differential pressure gauge. With existing flow meters, which as a rule have some internal working fluid leakage, it will show as a substantial decrease in the pressure drop, signifying a leak from the system.

Figure 4:
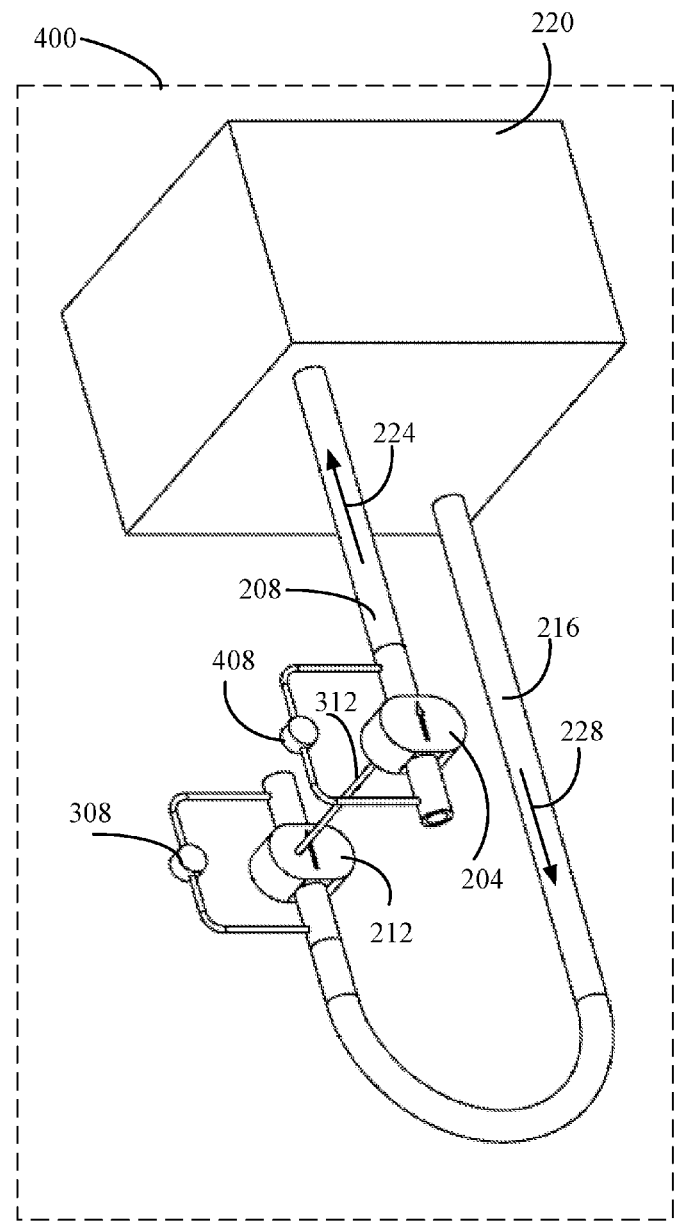
FIG. 4 is another example of the present fluid leakage detection system.

FIG. 4 is another example of the present fluid leakage detection system. Fluid leakage detection system 400 includes a first positive displacement flow meter 204 positioned on a working fluid inflow of fluid supply line 208 through which the working fluid flows into object 220 and a second identical positive displacement flow meter 212 positioned on a working fluid outflow or fluid return line 216 through which the working fluid flows out of object 220. Arrows 224 and 228 indicate the fluid flow direction. A first differential pressure gauge 308 is positioned on the fluid return line 216 and it is configured to gauge pressure drop in the second positive displacement flow meter 212 and a second differential pressure sensor 408 configured to gauge pressure drop in the first positive displacement flow meter 204. The two differential pressure gauges 308 and 408 could be pressure gauges configured to provide electrical reading of the measured pressure.

Positive displacement flow meters 204 and 212 are configured to have a mechanical connection 312 between one rotating element of the first positive displacement flow meter 204 and the matching rotating element of the second positive displacement flow meter 212. When there is no fluid leakage in the system, the two identical flow meters that are forced to rotate at the same speed will have exactly the same flow and will develop exactly the same pressure drop. The readings of both differential pressure meters will become identical in this case. However, if there is a fluid leakage in the system the first flow meter will be forced to rotate at a speed lower than its speed corresponding for the particular flow, developing greater pressure drop, and the second flow meter will be forced to rotate faster than its natural speed for the particular flow it sees, reducing the pressure drop on it. Subtracting the reading of the second pressure gauge from the reading of the first pressure gauge will be indicative of the leak. Dividing this value by the sum of the pressure drops will normalize the leakage to the fluid flow.

The same method could be used for modified pre calculated volumes of the flow meters to compensate for known working fluid temperature difference, or with flow meters made of construction materials that have thermal expansion coefficient that is selected to automatically compensate for the thermal expansion of the working fluid.

Figure 5:
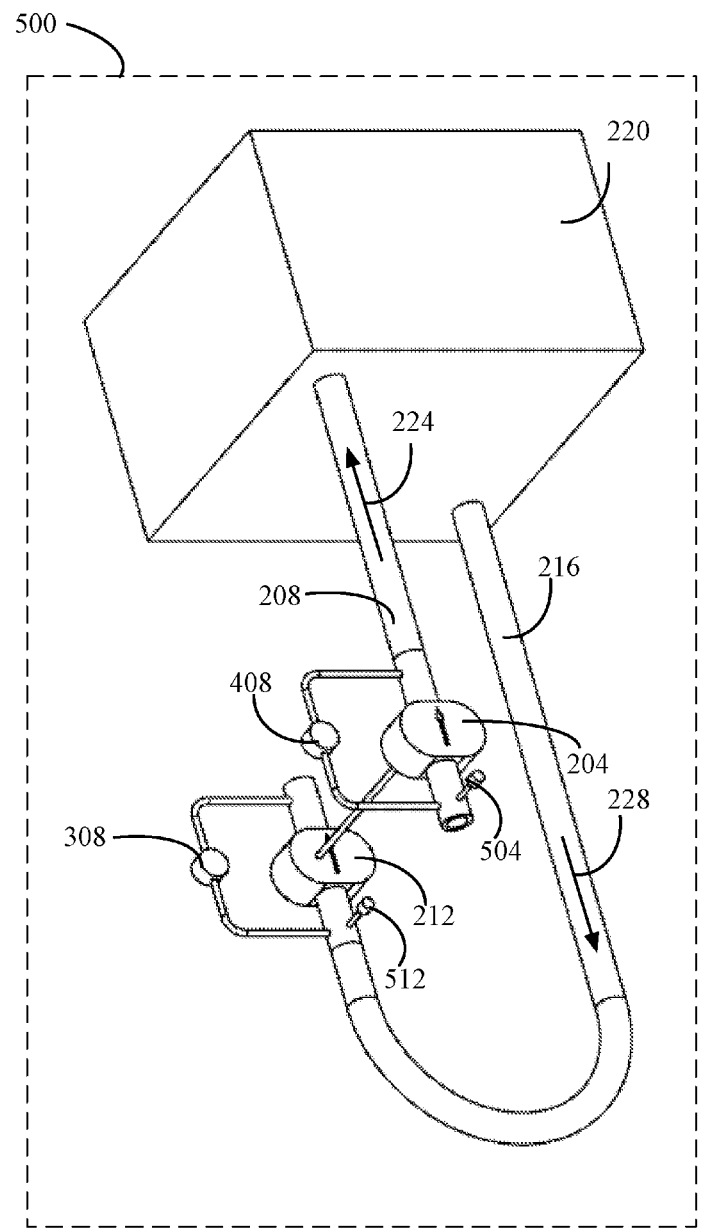
FIG. 5 is a further example of the present fluid leakage detection system.

FIG. 5 is another example of the present fluid leakage detection system. System 500 is similar to system 400. System 500 includes the first 204 and second 212 positive displacement flow meters and two differential pressure sensor 308 and 408 configured to gauge pressure drop in the first and second positive displacement flow meters 204 and 212. System 500 further includes two thermometers 504 and 512 configured to measure the temperature of the working fluid respectively at the inflow or supply line to object 220 and temperature of the used working fluid at the outflow or return line of object 220. The temperature readings of the two thermometers 504 and 512 could be entered into a calibration table and accounted to compensate for temperature differences between the working fluid in the supply 208 and return 216 lines through which the working fluid flows as shown by arrows 224 and 228. Otherwise temperature change may seem as a false fluid leakage or otherwise hide a real fluid leakage.

In another example, the first 204 and second 212 positive displacement flow meters could be pre-designed to have different volumes selected to compensate for known expected temperature-related differences between the fluid volume in the fluid supply line and the fluid volume in the fluid return line. In another example the first and second positive displacement flow meters could be made of materials having thermal expansion coefficients selected to correspond to and automatically correct for the known thermal expansion coefficient of the fluid in the system, thus automatically compensating for any temperature change.

Figure 6:
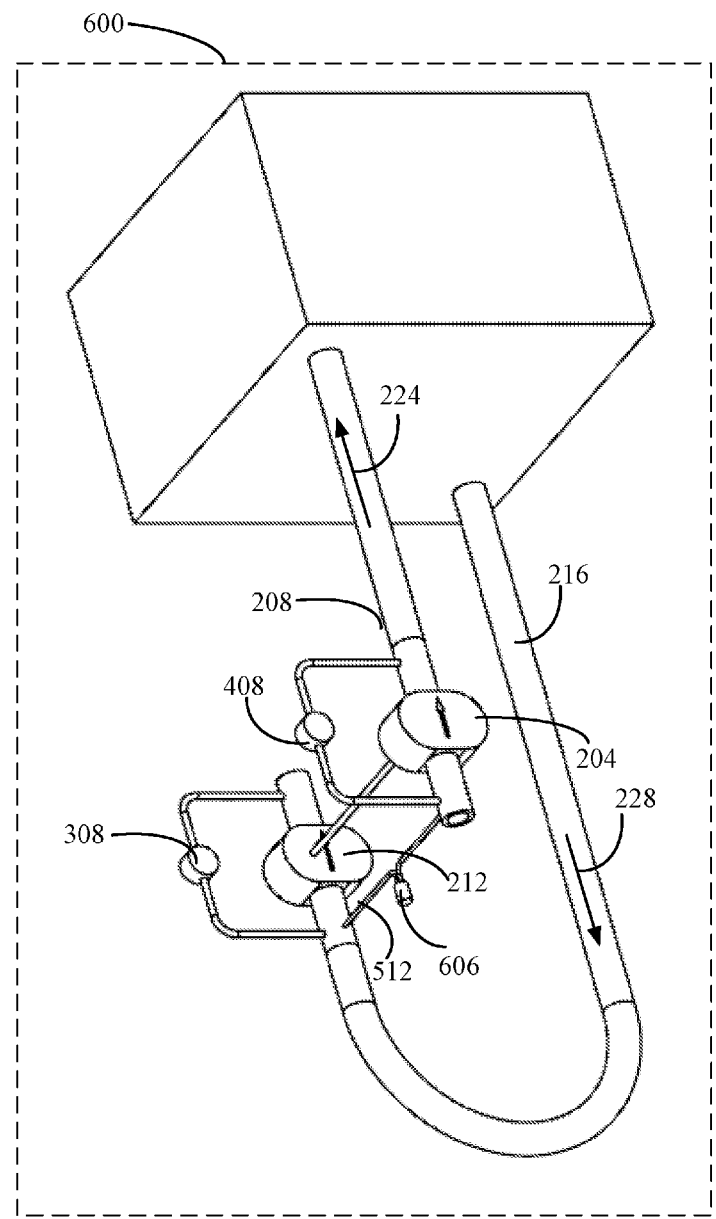
FIG. 6 is another example of the present fluid leakage detection system.

FIG. 6 is still another example of the present fluid leakage detection system. In this example two thermometers 504 and 512 (FIG. 5) configured to measure the temperature of the working fluid respectively at the inflow or supply line to object 220 and temperature of the used working fluid at the outflow or return line of object 220, have been replaced by one differential thermometer configured to measure the difference in the temperature of the working fluid in the supply and return lines.

Figure 7:
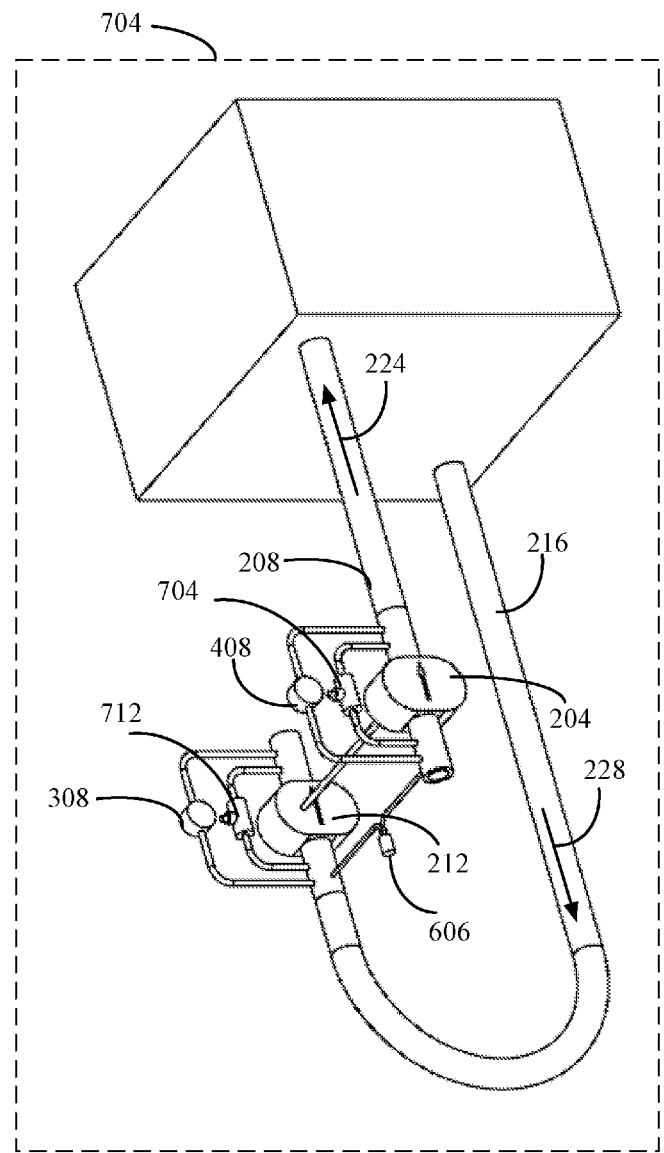
FIG. 7 is an example of the present fluid leakage detection system with two calibration bypass valves.

FIG. 7 is another example of the present fluid leakage detection system. System 700 includes two calibration bypass needle valves 704 and 712 mounted respectively across the positive displacement flow meters 204 and 212 at the fluid supply 208 and fluid return 216 lines. Such mounting of the calibration bypass needle valves 704 and 712 supports compensating for small differences between the two flow meters that happen due to tolerances in production. These calibration valves can be replaced by valves that automatically and mechanically adjust by the temperature and compensate in another way for the temperature change of the fluid in the system, reducing the need for the separate measurement of temperatures.

Figure 8:
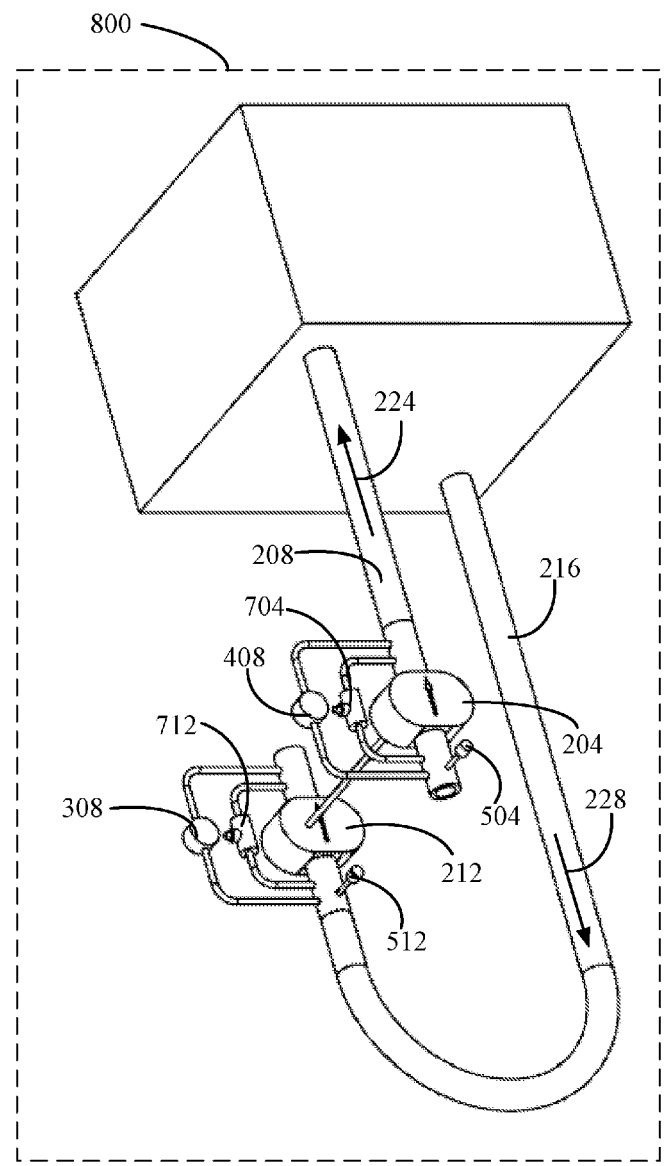
FIG. 8 is an example of the present fluid leakage detection system with two valves controlled by readings of their respective thermometers.

FIG. 8 is an example of the present fluid leakage detection system 800 with two calibration bypass valves 704 and 712. The valves operation is controlled by readings of their respective thermometers 504 and 512. This is another way to compensate for the temperature changes of the working fluid. This is especially useful for large systems, where the flow meters are constructed from metals to sustain large pressures and temperatures, and it is impossible to match their thermal coefficient of expansion with this of the liquid.

In a further example, the present fluid leakage detection system could be constructed to include one calibration bypass valve only. Temperature difference between thermometers 504 and 512 mounted on the working fluid supply line and the working fluid return line could be used to control the calibration bypass valve operation.

Fluid leakage detection systems 300 through 600 could accurately detect fluid leakage in the cooling or heating system. In the measurements made by the author of the present disclosure, the leakage detection accuracy was 0.005 thousands to less than 0.001 thousands of the total fluid volume These present system is constructed to meet at least tenfold better detecting capability than a system built on similar type of flow meters for similar flow rates.

What is claimed is:
1. A fluid leakage detection system comprising:
   at least one first positive displacement flow meter positioned on a working fluid supply line of a system through which the fluid flows;
   at least one second positive displacement flow meter positioned on a working fluid return line a system through which the fluid flows;
   at least one differential pressure sensor configured to gauge pressure drop in the second positive displacement flow meter; and
   wherein each of the first positive displacement flow meter and second positive displacement flow meter include at least one output rotating element and wherein the output rotating element of the first positive displacement flow meter and the output rotating element of the second positive displacement flow meter are mechanically linked between them such that the output rotating element of the first positive displacement flow meter and the output rotating element of the second positive displacement flow meter rotate at same speed.

2. The system according to claim 1, wherein the first and second positive displacement flow meters are pre-designed to have different volumes selected to compensate for known expected temperature-related differences between a working fluid volume in the fluid supply line and the working fluid volume in the fluid return line.

3. The system according to claim 1, wherein the first and second flow meters are made of materials having thermal expansion coefficients selected to correspond to and automatically correct for temperature-related differences in fluid volume in the supply line and the fluid volume in the return line.

4. The system according to claim 1, wherein the system is configured to detect a leakage less than 1 thousandth of a working fluid volume.

5. The system according to claim 1 further comprising at least one calibration bypass valve which is controlled by temperature difference between thermometers mounted on the working fluid supply line and the working fluid return line.

6. A fluid leakage detection system comprising:
at least one first positive displacement flow meter positioned on a working fluid supply line of a system through which the fluid flows;
at least one first differential pressure sensor configured to gauge pressure drop in the first positive displacement flow meter;
at least one second differential positive displacement flow meter positioned on a working fluid return line a system through which the fluid flows;
at least one second pressure sensor configured to gauge pressure drop in the second positive displacement flow meter; and
wherein each of the first positive displacement flow meter and second positive displacement flow meter include at least one output rotating element and wherein the output rotating element of the first positive displacement flow meter and the output rotating element of the second positive displacement flow meter are mechanically linked between them such that the output rotating element of the first positive displacement flow meter and the output rotating element of the second positive displacement flow meter rotate at same speed.

7. The system according to claim 6, wherein the first and second positive displacement flow meters are pre-designed to have different volumes selected to automatically compensate for temperature-related differences between a working fluid volume in the fluid supply line and the working fluid volume in the fluid return line.

8. The system according to claim 6 further comprising at least one calibration bypass valves the valve is controlled by temperature difference between thermometers mounted on the working fluid supply line and the working fluid return line.

9. The system according to claim 6, wherein the system is configured to detect a leakage less than 1 thousandth of a working fluid volume.

10. The system according to claim 6, also comprising at least one first temperature gauge positioned on the fluid supply line and at least one second temperature gauge positioned on the fluid return line.

11. The system according to claim 6, also comprising at least one temperature gauge and wherein the temperature gauge is a differential temperature gauge and wherein the differential pressure gauge is positioned on the fluid return line.

12. The system according to claim 6 wherein the first positive displacement flow meter and the second positive displacement flow meter are identical positive displacement flow meters.

13. A method for detecting fluid leakage in a fluid supply system comprising:
providing a fluid leakage detection system including
at least one first positive displacement flow meter positioned on a working fluid supply line and at least one first differential pressure sensor configured to gauge pressure drop in the first positive displacement flow meter; and
at least one second positive displacement flow meter positioned on a working fluid return line and at least one second differential pressure sensor configured to gauge pressure drop in the second positive displacement flow meter; and
comparing fluid pressure drop in the first positive displacement flow meter positioned on a fluid supply line with fluid pressure drop in a second positive displacement flow meter positioned on a fluid return; and
wherein an output rotating element of the first positive displacement flow meter is mechanically linked with corresponding output rotating element of the second positive displacement flow meter so that the output rotating elements of both flow meters rotate at same speed.

14. The method according to claim 13, wherein also
comparing fluid temperature in the first flow meter to working fluid temperature in the second flow meter: and
correcting for differences in a working fluid volumetric flow between the first positive displacement flow meter and the second positive displacement flow meter resulting from temperature-related differences between working fluid volume in the supply line and working fluid volume in the fluid return line, and for temperatures related volume changes of the flow meters.

15. The method according to claim 13, wherein also
adjusting fluid volumes of the first and second flow meters; and
compensating for temperature-related differences between the working fluid volume in the supply line and the working fluid volume in the fluid return line.

16. A fluid leakage detection system comprising:
at least one first differential positive displacement flow meter positioned on a working fluid supply line of a system through which the fluid flows;
at least one second differential positive displacement flow meter positioned on a working fluid return line a system through which the fluid flows; and
wherein the first positive displacement flow meter and second positive displacement flow meter include at least one output rotating element and wherein the output rotating element of the first positive displacement flow meter and the output rotating element of the second positive displacement flow meter are mechanically linked between them such that the output rotating element of the first positive displacement flow meter and the output rotating element of the second positive displacement flow meter rotate at the same speed.

17. The fluid leakage detection system according to claim 16 wherein
at least one first pressure sensor configured to gauge pressure drop in the first positive displacement flow meter; and
at least one second pressure sensor configured to gauge pressure drop in the second positive displacement flow meter; and
wherein at least one temperature gauge is configured to measure difference between temperature of working fluid supply line and working fluid return line and wherein the temperature reading is used to compensate for thermal expansion coefficient of the working fluid and the flow meter itself in the fluid leakage detection system.

18. The system according to claim 16, wherein the first and second flow meters are made of materials having thermal expansion coefficients selected to correspond to and automatically correct for known expected temperature-related differences in fluid volume in the supply line and the fluid volume in the return line, and the volume change of the flow meters.

* * * * *